United States Patent
Ernst et al.

(10) Patent No.: US 10,077,028 B2
(45) Date of Patent: Sep. 18, 2018

(54) WIPER ARM ARRANGEMENT

(71) Applicant: Robert Bosch GmbH, Stuttgart (DE)

(72) Inventors: Waldemar Ernst, Vaihingen/Enz (DE); Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 14/901,604

(22) PCT Filed: Jun. 13, 2014

(86) PCT No.: PCT/EP2014/062404
§ 371 (c)(1),
(2) Date: Dec. 28, 2015

(87) PCT Pub. No.: WO2014/206773
PCT Pub. Date: Dec. 31, 2014

(65) Prior Publication Data
US 2016/0368460 A1 Dec. 22, 2016

(30) Foreign Application Priority Data
Jun. 26, 2013 (DE) .......... 10 2013 212 194

(51) Int. Cl.
*B60S 1/52* (2006.01)
*B60S 1/34* (2006.01)
*B60S 1/38* (2006.01)

(52) U.S. Cl.
CPC .............. *B60S 1/522* (2013.01); *B60S 1/3429* (2013.01); *B60S 1/381* (2013.01)

(58) Field of Classification Search
CPC ................................. B60S 1/522; B60S 1/524

USPC ........................................................ 15/250.04
See application file for complete search history.

(56) References Cited

U.S. PATENT DOCUMENTS

| | | | |
|---|---|---|---|
| 3,793,666 A * | 2/1974 | Brillenburg Wurth | ...................... B60S 1/522 15/250.04 |
| 3,940,068 A | 2/1976 | Mohnach et al. | |
| 4,782,547 A * | 11/1988 | Mohnach | .............. B60S 1/0408 15/250.04 |
| 5,894,626 A * | 4/1999 | Edele | ........................ B60S 1/32 15/250.04 |
| 6,442,788 B1 * | 9/2002 | Fleischer | ................ B60S 1/522 15/250.04 |

(Continued)

FOREIGN PATENT DOCUMENTS

| | | |
|---|---|---|
| CN | 1558798 A | 12/2004 |
| DE | 2942086 | 4/1981 |

(Continued)

OTHER PUBLICATIONS

International Search Report for Application No. PCT/EP2014/062404 dated Aug. 19, 2014 (English Translation, 3 pages).

*Primary Examiner* — Andrew A Horton
(74) *Attorney, Agent, or Firm* — Michael Best & Friedrich LLP

(57) ABSTRACT

The invention is based on a wiper arm arrangement comprising at least one wiper fluid channeling unit (12) that has at least one wiper fluid duct (14) and at least one coupling unit (16) which is designed to be connected to a wiper stem (18) of a wiper arm (20). (14) cha It is proposed that the at least one wiper fluid duct (14) be made integral with the at least one coupling unit (16).

19 Claims, 2 Drawing Sheets

(56) References Cited

U.S. PATENT DOCUMENTS

2002/0000481 A1* 1/2002 Utz .................. B60S 1/522
                                                239/284.1
2003/0009841 A1* 1/2003 Sato ................ B60S 1/3415
                                                15/250.04

FOREIGN PATENT DOCUMENTS

| DE | 8716154 | 1/1988 | |
|----|---------|--------|--|
| DE | 4415081 | 11/1995 | |
| FR | 2603850 A1 * | 3/1988 | ............ B60S 1/3806 |
| FR | 2747975 A1 * | 10/1997 | ................ B60S 1/32 |
| FR | 2781743 | 2/2000 | |
| GB | 2151465 | 7/1985 | |

* cited by examiner

WIPER ARM ARRANGEMENT

BACKGROUND OF THE INVENTION

A wiper arm arrangement comprising at least one wiper fluid channeling unit that has at least one wiper fluid duct and at least one coupling unit which is designed to be connected to a wiper stem of a wiper arm has already been proposed.

SUMMARY OF THE INVENTION

The invention is based on a wiper arm arrangement comprising at least one wiper fluid channeling unit that has at least one wiper fluid duct and at least one coupling unit which is designed to be connected to a wiper stem of a wiper arm.

According to the invention, the at least one wiper fluid duct is made integral with the at least one coupling unit. The wiper fluid duct is preferably designed to channel wiper fluid at least substantially along a main extension direction of the wiper arm. A "wiper fluid channeling unit" is to be understood in this context particularly as a unit which is designed in at least one operating state to channel wiper fluid at least in a partial section of a distance, in particular, from a reservoir to a surface to be washed, such as, in particular, a window pane. A unit is thereby particularly to be understood which is designed in one operating state to channel wiper fluid for cleaning a window pane at least in a partial section of a distance, in particular, from a reservoir to the window pane to be cleaned. In addition, a "wiper fluid duct" is particularly to be understood as a duct which is designed to guide a wiper fluid particularly in at least one partial section, in particular, from a reservoir to the at least two wiper nozzle units during an operation of the wiper fluid distribution unit. A duct is thereby particularly to be understood which is designed at least in a partial section to accommodate wiper fluid to a line and/or a delivery system. In a particularly preferred manner, a duct is particularly to be understood which is designed to directly receive wiper fluid in at least one operating state. In addition, a "coupling unit" is to be understood in this context particularly as a unit which is designed to produce a connection, in particular a connection which can be released in a nondestructive manner. A unit is thereby particularly to be understood which is designed to connect at least the wiper fluid channeling unit to a wiper stem of a wiper arm in a positive locking, form-fit and/or materially bonded manner. In a particularly preferred manner, a unit is thereby to be understood which is designed to produce a connection that can be released in a nondestructive manner, wherein said connection can especially be produced without the use of tools. "Designed" is to be particularly understood in this context as being specially configured and/or equipped. By virtue of the fact that an object is designed for a certain function, it is particularly to be understood that the object fulfills or carries out this particular function in at least one state of application and/or operation. Furthermore, a "wiper stem" is particularly to be understood in this context as an elongated component of the wiper arm which extends at least substantially parallel to a main extension direction of the wiper arm. In particular, a component is preferably thereby understood which is designed to connect a drive axis of the wiper arm indirectly to a receiving region for a wiper blade in order to transmit a motion, in particular a rotational motion. In addition, "integral" is particularly to be understood in this context as being at least connected in a materially bonded manner, for example by means of a welding process, an adhesive bonding process, an injection molding process and/or by means of another process that appears to be useful to the person skilled in the art and/or to be understood as being advantageously formed in one piece, such as, for example, by a production from a cast and/or by a production in a single or multicomponent injection molding process and advantageously from a single blank. A "main extension direction" of a structural unit is particularly to be understood in this context as a direction which extends parallel to the longest lateral edge of the smallest geometric cuboid which the structural unit can just barely completely enclose.

By designing the wiper arm arrangement according to the invention, a number of parts can advantageously be kept small. As a result, a wiper arm arrangement that is particularly easy to install can furthermore, in particular, be provided. In addition, an easy and quick retrofitting of a wiper arm arrangement on a wiper arm can thereby be achieved.

It is furthermore proposed that the at least one coupling unit has at least one clip fastening element. A clip fastening element is particularly to be understood in this context as a fastening element that has at least one detent means. The at least one detent means can be designed to lock with the fastening element itself and/or to a component to be coupled. A "detent means" is to be particularly understood as a resilient means for producing a detent connection which is designed to be resiliently deflected during installation. In so doing, a wiper arm arrangement that is particularly easy to install can thereby be provided. In particular, an especially advantageously simple coupling can be achieved. In a preferable manner, the wiper fluid channeling unit of the wiper arm arrangement can easily be clipped by an operator onto the wiper arm. In particular, an easy and quick retrofitting of a wiper arm arrangement on a wiper arm can thereby be achieved.

It is furthermore proposed that the at least one coupling unit has at least one wiper arm receiving region for receiving the wiper stem, said receiving region having at least approximately a cross-sectional shape of the wiper stem. That means particularly that the wiper arm receiving region has a cross-sectional shape which corresponds at least approximately to a cross-sectional shape of the wiper stem. A "wiper arm receiving region" is particularly to be understood in this context as a region which is provided for receiving the wiper arm. The receiving region preferably comprises a recess which has a cross-sectional shape that corresponds at least approximately to a cross-sectional shape of the wiper arm in an accommodated region. In a particularly preferred manner, the recess is surrounded by walls of the coupling unit in an angular range of at least 90°, preferably of at least 180° and in an especially preferred manner of at least 270° in an at least one plane, as viewed from a central point of the recess in the plane. By "corresponds at least approximately", it is to be understood in this context that at least 40%, preferably at least 60% and in an especially preferred manner maximally 80% of a surface of a cross-sectional shape is congruent with respect to a surface of the at least approximately corresponding cross-sectional shape. As a result, a particularly advantageous and reliable coupling at least of the wiper fluid channeling unit of the wiper arm arrangement to the wiper arm can be achieved. In particular, an especially simple and intuitive installation can thereby be implemented.

It is furthermore proposed that the at least one coupling unit has at least one blocking device which is provided to secure the wiper fluid channeling unit on the wiper stem of the wiper arm. The at least one blocking device is preferably provided to block the at least one clip fastening element, in particular, from opening. In a particularly preferable manner, the at least one blocking device is designed to block the at least one detent means of the at least one clip fastening element. A "blocking device" is to be particularly understood in this context as a device which is provided for blocking or, respectively, securing a connection. A device is particularly to be understood which is designed to prevent an undesired release of a connection, in particular a connection between the wiper fluid channeling unit and the wiper stem of the wiper arm. In a particularly preferred manner, the blocking device comprises a blocking means which is intended to be actively removed, manipulated, turned, displaced and/or activated or deactivated by other active procedures which are considered useful by the person skilled in the art in order to release the blocking device. As a result, the wiper fluid channeling unit can particularly be prevented from inadvertently releasing from the wiper stem of the wiper arm. Hence, the wiper fluid channeling unit can thereby be prevented from being pushed away from the wiper stem by an airstream and/or by a simple act of theft.

It is furthermore proposed that the wiper arm arrangement comprises at least one wind deflector element. A "wind deflector element" is particularly to be understood in this context as a unit which is designed to be used to deflect an airstream acting on the wiper arm arrangement and/or to press said wiper arm arrangement against a wiper arm. In a preferable manner, the wind deflector element has at least one concave outer surface. In so doing, a particularly advantageous wiper arm arrangement can be provided. Furthermore, an inadvertent release of the wiper arm arrangement, for example by means of an airstream, can thus be prevented respectively avoided.

It is furthermore proposed that the at least one wiper fluid channeling unit comprises the at least one wind deflector element. The at least one wind deflector element is preferably integrally formed with the at least one wiper fluid duct and the at least one coupling unit of the at least one wiper fluid channeling unit. As a result, an inadvertent release of the wiper fluid channeling unit of the wiper arm arrangement from the wiper stem of the wiper arm, for example by means of an airstream, can particularly be prevented respectively avoided. In addition, a number of parts can thereby be kept small. As a result, a simple installation can in turn be achieved.

It is furthermore proposed that the wiper arm arrangement comprises at least one wiper nozzle unit that includes at least one wiper nozzle element for applying wiper fluid to a surface to be washed. A "wiper nozzle unit" is particularly to be understood in this context as a unit which is designed to apply fluid, in particular a wiper fluid, for cleaning a surface, in particular a window pane. The unit is preferably designed to apply the fluid via a wiper nozzle element for cleaning a window pane. A "wiper nozzle element" is to be understood in this case as an element which is designed to spray a fluid, in particular wiper fluid for cleaning a window pane, in particular a window pane of a motor vehicle, in a particular discharge direction. In this connection, the nozzle element preferably has a connecting element for connecting a wiper fluid tube and/or a wiper fluid pump, in particular of the wiper nozzle unit. As a result, a reliable distribution and/or application of wiper fluid can especially be achieved.

It is furthermore proposed that the wiper arm arrangement has at least one connecting element which connects the at least one wiper nozzle unit to the at least one wiper fluid duct of the at least one wiper fluid channeling unit. A "connecting element" is particularly to be understood in this context as an element which is designed to connect the wiper nozzle unit to the wiper fluid duct. An element is preferably thereby understood which is designed to feed or lead wiper fluid from the wiper fluid duct to the wiper nozzle unit. In a particularly preferred manner, the element is at least partially formed from a duct, such as especially a tube. In so doing, a connection can advantageously be implemented between the at least one wiper nozzle unit and the at least one wiper fluid duct. As a result, a transmission of wiper fluid from the at least one wiper fluid duct to the at least one wiper nozzle unit can be implemented in a preferable manner.

It is furthermore proposed that the wiper nozzle unit has at least one coupling unit, which, in an installed state, is designed to be connected to a wiper arm. In an installed state, the coupling unit is preferably designed to be connected to a wiper arm adapter of the wiper arm. A "wiper arm adapter" is particularly to be understood in this context as an adapter which has a contact area with a wiper arm component and is captively connected to the wiper arm component and which is designed to provide a coupling region of the wiper arm component for a coupling and/or contacting to a wiper blade adapter. In this case, a "wiper blade adapter" is particularly to be understood as an adapter which has a contact region with a wiper blade component and is captively connected to the wiper blade component and which is designed to provide a coupling region of the wiper blade component for a coupling and/or contacting to the wiper arm adapter. As a result, a wiper arm arrangement that is especially easy to install can particularly be provided. In particular, the wiper nozzle unit can thereby be likewise connected to the wiper arm. In a particularly preferred manner, the wiper nozzle unit can be connected to the wiper arm separately from the wiper fluid channeling unit, whereby a high degree of flexibility can be achieved.

The wiper arm arrangement according to the invention is hereby not limited to the application and embodiment described above. The inventive wiper arm arrangement can particularly have a number of individual elements, components and units which deviates from the number stated here in the application in order to fulfill a functionality described herein.

BRIEF DESCRIPTION OF THE DRAWINGS

Further advantages ensue from the following description of the drawings. An exemplary embodiment is depicted in the drawings. The drawings, the description and the claims contain numerous features in combination. The person skilled in the art will expediently consider the features in isolation and put them together to form further useful combinations.

In the drawings.

DETAILED DESCRIPTION

Figure 1:
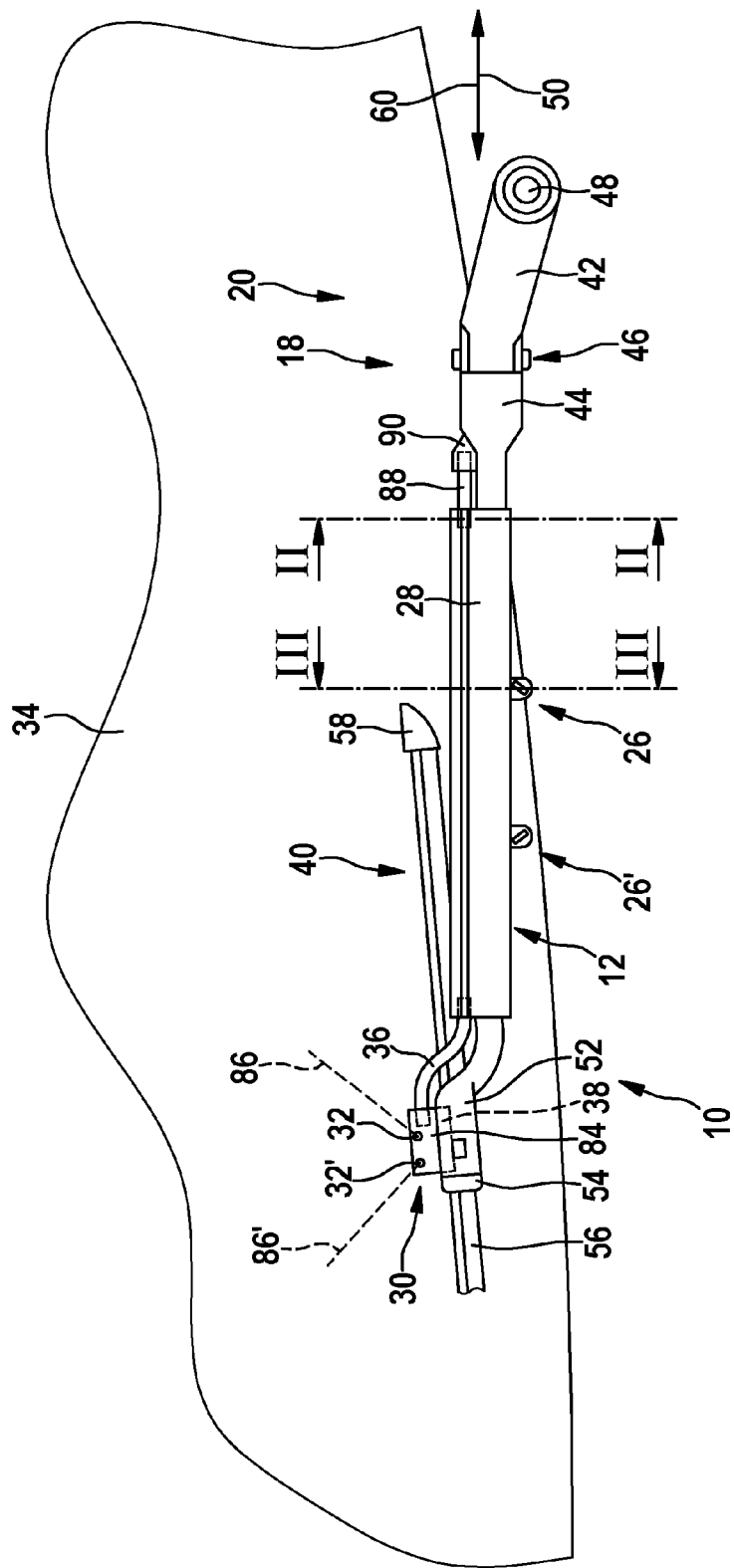
FIG. 1 shows an inventive wiper arm arrangement comprising a wiper fluid channeling unit and comprising a wiper nozzle unit, a wiper arm and a partial cutout of a wiper blade in a schematic depiction.

FIG. 1 shows a wiper arm arrangement 10 according to the invention, a wiper arm 20 and a wiper blade 40. FIG. 1 furthermore shows a surface 34 to be washed of a motor vehicle which is not further visible. The surface 34 to be washed is in the form of a window pane.

The wiper arm 20 has a wiper stem 18. The wiper stem 18 has two wiper arm segments 42, 44 and a hinge 46. The wiper arm segments 42, 44 are connected by means of the hinge 46. In addition, a spring element which is not visible is disposed in the region of the hinge 46. The spring element which is not visible is provided to press the second wiper arm segment 44 in the direction of the surface 34 to be washed in a pressing region of said second wiper arm segment 44. The surface 34 to be washed is formed by a window pane of a motor vehicle. The first wiper arm segment 42 is connected via a pivot pin 48 to a motor vehicle that is not further visible. The pivot pin 48 is, when viewed along a main extension direction 50 of the wiper arm 20, connected to the wiper stem 18 at an outer end of the wiper arm 20. Said pivot pin 48 is driven by a drive motor which is not visible in the drawing. A wiper arm adapter 52 is arranged at an end of the second wiper arm segment 44 that faces away from the hinge 44. The wiper arm adapter 52 is formed integrally with the second wiper arm segment 44. The wiper arm adapter 52 is provided for receiving a wiper blade adapter 54 of the wiper blade 40. The wiper arm adapter 52 receives the wiper blade adapter 54.

The wiper blade 40 comprises the wiper blade adapter 54. The wiper blade 40 has the wiper blade adapter 54 for coupling to the wiper arm 20. In addition, the wiper blade 40 has a wind deflector unit 56, two spring rails which are not visible, a wiper lip which is not visible and two end caps 58, of which only one is visible. In an operating state, the wiper blade 40 wipes across a surface 34 to be washed. The wiper lip of the wiper blade 40, which lip is not visible, is designed to rest against the surface 34 to be washed and to wipe across the same during an operating state of the wipers. The wiper lip, which is not visible, is held by means of spring rails, which are not visible, in the wind deflector unit 56.

Figure 3:
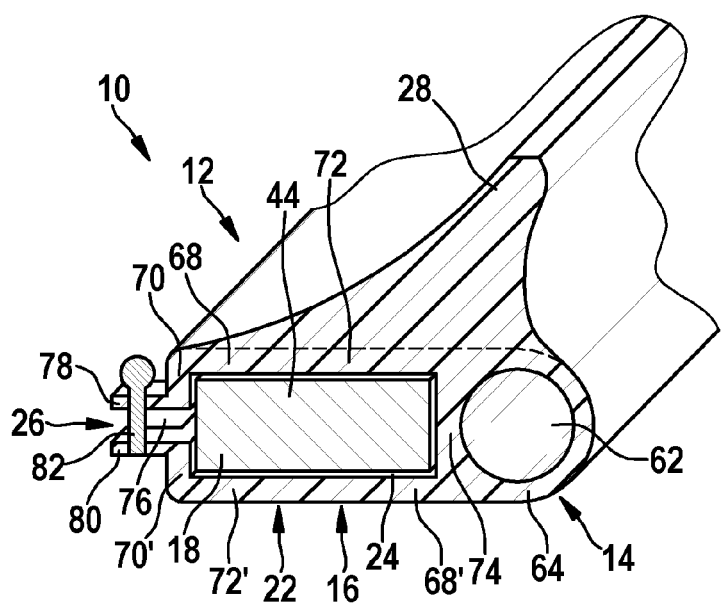
FIG. 3 shows an inventive wiper arm arrangement comprising the wiper fluid channeling unit in a further schematic cross-sectional depiction along the cutting line III.

The wiper arm arrangement 10 comprises a wiper fluid channeling unit 12. The wiper fluid channeling unit 12 has a main extension direction 60 which corresponds to a main extension direction 50 of the wiper arm 20 in an installed state. The wiper fluid channeling unit 12 has a wiper fluid duct 14. The wiper fluid duct 14 is designed to channel wiper fluid along the main extension direction 50 of the wiper arm 20. The wiper fluid duct 14 comprises a cylindrical recess 62. The cylindrical recess 62 of the wiper fluid duct 14 extends along the main extension direction 60 of the wiper fluid channeling unit 12 across the entire length of said wiper fluid channeling unit 12. The cylindrical recess 62 extends parallel to the main extension direction 60 of the wiper fluid channeling unit 12. The cylindrical recess 62 is delimited by a base body 64 of the wiper fluid duct 14 (FIG. 3).

Figure 2:
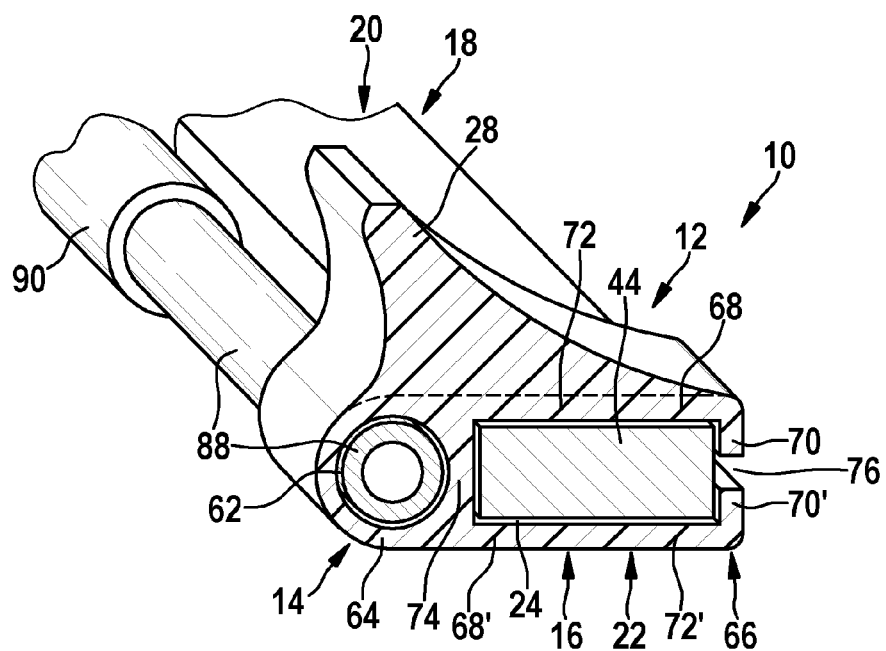
FIG. 2 shows the inventive wiper arm arrangement comprising the wiper fluid channeling unit in a schematic cross-sectional depiction along the cutting line II.

The wiper fluid channeling unit 12 furthermore has a coupling unit 16. The coupling unit 16 is designed to be connected to the wiper stem 18 of the wiper arm 20. The coupling unit 16 is designed to connect the wiper fluid channeling unit 12 to the wiper stem 18 of the wiper arm 20. The coupling unit 16 is designed to be connected to the second wiper arm segment 44 of the wiper stem 18. In addition, the coupling unit 16 has a clip fastening element 22. The coupling element 16 has a base body 66 which comprises the clip fastening element 22. The clip fastening element 22 consists of two attachment webs 68, 68'. The attachment webs 68, 68' are each formed by detent elements. The attachment webs 68, 68' have, when viewed in a plane perpendicular to the main extension direction 60 of the wiper fluid channeling unit 12, in each case an L-shaped cross-sectional shape, wherein the two attachment webs 68, 68' are mirrored to one another. A short side 70, 70' of the L-shaped attachment webs 68, 68' is in each case partially detached and protrudes in each case perpendicularly to an associated long side 72, 72'. The short sides 70, 70' of the attachment webs 68, 68' protrude respectively from the long sides 72, 72' so as to face each other. The long sides 72, 72' of the attachment webs 68, 68' extend parallel to one another. The two attachment webs 68, 68' are connected to one another via a base side 74 of the base body 66 of the coupling unit 16 at the ends of the long sides 72, 72' that face away from the short sides 70, 70'(FIGS. 2, 3).

The coupling unit 16 further comprises a wiper arm receiving region 24. The wiper arm receiving region 24 is designed to receive the wiper stem 18 of the wiper arm 20. The wiper arm receiving region 24 is designed to receive the second wiper arm segment 44 of the wiper stem 18. In addition, the wiper arm receiving region 24 has approximately the cross-sectional shape of the wiper stem 18. The wiper arm receiving region 24 has, when viewed in a plane perpendicular to the main extension direction 60 of the wiper fluid channeling unit 12, a cross-sectional shape which approximately corresponds to a cross-sectional shape of the wiper stem 18. The wiper arm receiving region 24 extends along the main extension direction 60 of the wiper fluid channeling unit 12 across the entire length of said wiper fluid channeling unit 12. The wiper arm receiving region 24 extends parallel to the main extension direction 60 of the wiper fluid channeling unit 12. The wiper arm receiving region 24 is, when viewed in a plane perpendicular to the main extension direction 60 of the wiper fluid channeling unit 12, delimited on four sides by the base body 66 of the coupling unit 16. The wiper arm receiving region 24 is delimited in one direction by the base side 74 of the base body 66. Said wiper arm receiving region 24 is delimited in two further directions by the two long sides 72, 72' of the two attachment webs 68, 68'. Said wiper arm receiving region 24 is delimited in a fourth direction by the two short sides 70, 70' of the two attachment webs 68, 68'. A gap 76 is arranged between the two short sides 70, 70' of the two attachment webs 68, 68', via which gap the wiper stem 18 of the wiper arm 20 can be brought into said wiper arm receiving region 24. As a result, the two attachment webs 68, 68' are resiliently deflected outwards by pressure; thus enabling the gap 76 to become larger and the wiper stem 18 to be pushed through said gap 76 (FIGS. 2, 3).

The coupling unit 16 has furthermore two blocking devices 26, 26'. The blocking devices 26 are designed to secure the wiper fluid channeling unit 12 on the wiper stem 18 of the wiper arm 20. The blocking device 26 is intended to prevent an inadvertent release of the wiper fluid channeling unit 12 from the wiper stem 18, for example as a result of an airstream. The blocking devices 26, 26' each comprise two retaining plates 78, 80 and a threaded pin 82. The blocking elements 26, 26' are of identical design. The retaining plates 78, 80 are each semicircular and are integrally connected to the two attachment webs 68, 68'. The first retaining plates 78 of the blocking devices 26, 26' each have a through bore and are disposed at one end of the short side 70 of the first attachment web 68 of the coupling unit 16. The second retaining plates 80 of the blocking devices 26, 26' each have a threaded bore and are disposed at one end of the short side 70' of the second attachment web 68' of the coupling unit 16. By means of the threaded pins 82, the first retaining plates 78 can each be screwed via the through holes to the associated second retaining plate 80 via the threaded bores. The second blocking devices 26, 26' prevent the attachment webs 68, 68' from being resiliently deflected outwards in a closed state of the blocking devices 26, 26'. In principle, another design of the at least one blocking device 26, 26' that appears useful to the person skilled in the art would, however, also be conceivable. The at least one blocking device 26, 26' can thereby have a completely differing function. The function is particularly critical for the at least one blocking device 26, 26' (FIGS. 1, 3).

The wiper fluid duct 14 of the wiper fluid channeling unit 12 is formed integrally with the coupling unit 16 of said wiper fluid channeling unit 12. The base body 64 of the wiper fluid duct 14 and the base body 66 of the coupling unit 16 are produced from a single cast. The base body 64 of the wiper fluid duct 14 and the base body 66 of the coupling unit 16 consist of the same material. The base body 64 of the wiper fluid duct 14 and the base body 66 of the coupling unit 16 consist of plastic. The wiper fluid duct 14 is disposed on a side of the coupling unit 16 facing away from the gap 76 (FIGS. 2, 3).

The wiper arm arrangement 10 further comprises a wind deflector element 28. The wiper fluid channeling unit 12 comprises the wind deflector element 28. The wind deflector element 28 is formed integrally with the wiper fluid duct 14 and the coupling unit 16 of the wiper fluid channeling unit 12. The wind deflector element 28 extends along the main extension direction 60 of the wiper fluid channeling unit 12 over the entire length of said wiper fluid channeling unit 12. The wind deflector element 28 directly adjoins the first attachment web 68 of the coupling unit 16 in a direction oriented away from the second attachment web 68'. Said wind deflector element 28 extends in width, perpendicularly to the main extension direction 60 of the wiper fluid channeling unit 12, substantially across the entire wiper fluid duct 14 and the entire coupling unit 16. In principle, it would, however, also be conceivable for the wiper arm arrangement 10 respectively the wiper fluid channeling unit 12 not to have a wind deflector element 28, as depicted by the dashed line in FIGS. 2 and 3.

The wiper fluid channeling unit 12 has, with the exception of the two blocking devices 26, 26', a constant cross-sectional shape over the entire length thereof, when viewed along the main extension direction 60 of the wiper fluid channeling unit 12. Said wiper fluid channeling unit 12 is produced in an extrusion process with the exception of the two blocking devices 26, 26'. The two blocking devices 26, 26' are subsequently molded to said wiper fluid channeling unit 12. In principle, other production methods that appear useful to the person skilled in the art are also conceivable.

In addition, the wiper arm arrangement 10 comprises a wiper nozzle unit 30. The wiper nozzle unit 30 has two wiper nozzle elements 32, 32'. The wiper nozzle elements 32, 32' are formed in each by nozzles. The wiper nozzle elements 32, 32' are furthermore designed to apply wiper fluid to a surface 34 to be washed. The wiper nozzle elements 32, 32' are designed to apply wiper fluid to a window pane. The wiper nozzle elements 32, 32' are integrated into a base body 84 of the wiper nozzle unit 30. The wiper nozzle elements 32, 32' are connected by means of a wiper fluid duct which is introduced into the base body 84 and is not visible her. The wiper fluid duct that is no longer visible in the drawings is led to an outer edge of the base body 84. The wiper nozzle elements 32, 32' further have in each case a discharge direction 86, 86' which is directed towards the surface 34 to be washed. In addition, the wiper nozzle unit 30 comprises a coupling unit 38. The coupling unit 38 of the wiper nozzle unit 30 is designed to be connected to the wiper arm 20 in an installed state. Said coupling unit 38 of the wiper nozzle unit 30 is designed in an installed state to be connected to the wiper arm adapter 52 of the wiper arm 20. Said coupling unit 38 of the wiper nozzle unit 30 is no longer visible in the coupling thereof to the wiper arm adapter 52. Said coupling unit 38 of the wiper nozzle unit 30 is furthermore designed to connect the wiper nozzle unit 30 to the wiper arm adapter 52. Said coupling unit 38 of the wiper nozzle unit 30 is formed integrally with the base body 84 of the wiper nozzle unit 30 (FIG. 1). In principle, it is, however, also conceivable for the wiper nozzle unit 30 to be integrated into the wiper blade 40, in particular into the wiper blade adapter 54.

In addition, the wiper arm arrangement 10 comprises a first connecting element 36. The first connecting element 36 connects the wiper nozzle unit 30 to the wiper fluid duct 14 of the wiper fluid channeling unit 12. The first connecting element 36 connects the wiper fluid duct of the wiper nozzle unit 30, said wiper fluid duct not being visible, to the wiper fluid duct 14 of the wiper fluid channeling unit 12. Said first connecting element 36 is formed by a tube. Said first connecting element 36 is adhesively bonded with a first end thereof in an end region of the wiper fluid duct 14 of the wiper fluid channeling unit 12. In addition, said first connecting element 36 is adhesively bonded with a second end thereof opposite to the first end in an end region of the wiper fluid duct of the wiper nozzle unit 30 (FIG. 1), said wiper fluid duct not being visible. In principle, it would, however, also be conceivable for said first connecting element 36 to be connected in each case via connecting pieces to the wiper nozzle unit 30 and/or to the wiper fluid channeling unit 12.

The wiper arm arrangement further comprises a second connecting element 88. The second connecting element 88 connects a wiper fluid feed 90 to the wiper fluid duct 14 of the wiper fluid channeling unit 12. The wiper fluid feed 90 is formed by a wiper fluid supply tube. The second connecting element 12 is formed by a fixed pipe. Said second connecting element 12 is adhesively bonded with a first end thereof in an end region of the wiper fluid feed 90. Said second connecting element 88 is further is adhesively bonded with a second end thereof opposite to the first end in an end region of the wiper fluid duct 14 of the wiper fluid channeling unit 12 (FIGS. 1, 2). In principle, it would, however, also be conceivable for the connecting element 88 to be already produced as one piece with the wiper fluid duct 14. In addition, it would also be conceivable in principle for the connecting element 88 to in each case be connected via a connecting piece to the wiper fluid channeling unit 12 and/or to the wiper fluid feed 90.

The wiper arm 20 and the wiper arm arrangement 10 form a wiper arm system.

What is claimed is:

1. A wiper arm arrangement comprising at least one wiper fluid channeling unit (12) that has at least one wiper fluid duct (14) and at least one coupling unit (16) which is configured to be connected to a wiper arm stem (18) of a wiper arm (20), characterized in that the at least one wiper fluid duct (14) is integrally formed with the at least one coupling unit (16), wherein the at least one coupling unit (16) has at least one clip fastening element (22) that includes a base portion (74), a first attachment web (68) extending from the base side (74) and having a first long portion (72) and a first short portion (70) extending away from the first long portion at a non-zero angle, and a second attachment web (68') extending from the base portion (74) and having a second long portion (72') and a second short portion (70') extending away from the second long portion (72') at a non-zero angle, wherein the first and second long portions (72, 72') are disposed between the wiper fluid duct (14) and the first and second short portions (70, 70'), wherein the base portion (74) and the first and second attachments webs (68, 68') together define a wiper arm receiving region (24) to receive the wiper arm stem (18), wherein the first and second long portions (72, 72') are configured to extend along a width of the wiper arm stem (18) and the base portion (74) and the first and second short portions (70, 70') are configured to extend along a height of the wiper arm stem (18), the width being greater than the height, and wherein a gap (76) is provided between the first short portion (70) and the second short portion (70'), wherein the at least one coupling unit (16) has at least one blocking device (26, 26') which is configured to secure the wiper fluid channeling unit (12) on the wiper stem (18) of the wiper arm (20) and to inhibit the first attachment web (68) from being pulled apart from the second attachment web (68').

2. The wiper arm arrangement according to claim 1, wherein the wiper arm receiving region has at least approximately a cross-sectional shape of the wiper stem (18).

3. The wiper arm arrangement according to claim 1, further comprising at least one wind deflector element (28).

4. The wiper arm arrangement according to claim 3, characterized in that the at least one wiper fluid channeling unit (12) comprises the at least one wind deflector element (28).

5. The wiper arm arrangement according to claim 1, further comprising at least one wiper nozzle unit (30) comprising at least one wiper nozzle element (32, 32') for applying wiper fluid onto a surface (34) to be washed.

6. The wiper arm arrangement according to claim 5, further comprising at least one connecting element (36) which connects the at least one wiper nozzle unit (30) to the at least one wiper fluid duct (14) of the at least one wiper fluid channeling unit (12).

7. The wiper arm arrangement at least according to claim 5, characterized in that the wiper nozzle unit (30) comprises at least one coupling unit (38) which, in an installed state, is configured to be connected to the wiper arm (20).

8. A wiper arm system comprising a wiper arm (20) and a wiper arm arrangement (10) according to claim 1.

9. The wiper arm system according to claim 8, wherein the wiper arm receiving region has at least approximately a cross-sectional shape of the wiper stem (18).

10. The wiper arm system according to claim 8, further comprising at least one wind deflector element (28).

11. The wiper arm system according to claim 10, characterized in that the at least one wiper fluid channeling unit (12) comprises the at least one wind deflector element (28).

12. The wiper arm system according to claim 8, further comprising at least one wiper nozzle unit (30) comprising at least one wiper nozzle element (32, 32') for applying wiper fluid onto a surface (34) to be washed.

13. The wiper arm system according to claim 12, further comprising at least one connecting element (36) which connects the at least one wiper nozzle unit (30) to the at least one wiper fluid duct (14) of the at least one wiper fluid channeling unit (12).

14. The wiper arm system at least according to claim 12, characterized in that the wiper nozzle unit (30) comprises at least one coupling unit (38) which, in an installed state, is connected to the wiper arm (20).

15. The wiper arm arrangement according to claim 1, wherein the first and second attachment webs (68, 68') are arranged such that they are configured to flex apart from one another to receive the wiper arm stem (18) in the wiper arm receiving region (24) through the gap (76).

16. The wiper arm arrangement according to claim 1, wherein the first and second attachment webs (68, 68') are each L-shaped, such that the first short portion (70) projects toward the second short portion (70').

17. The wiper system according to claim 1, further comprising the wiper arm disposed within the clip fastening element.

18. The wiper system according to claim 1, wherein the first long portion and the second long portion each extend perpendicularly from the base portion and parallel to one another, and wherein the first and second short portions extend perpendicularly from ends of the first and second long portions, respectively, and toward one another.

19. The wiper system according to claim 1, wherein the at least one blocking device (26, 26') includes two retaining plates, each coupled to one of the first attachment web (68) or the second attachment web (68'), and a threaded pin coupled to both of the retaining plates.

* * * * *